Oct. 28, 1947.  G. W. KEAN  2,429,820
SAFETY VALVE FOR HYDRAULIC BRAKES
Filed March 22, 1945  2 Sheets-Sheet 1
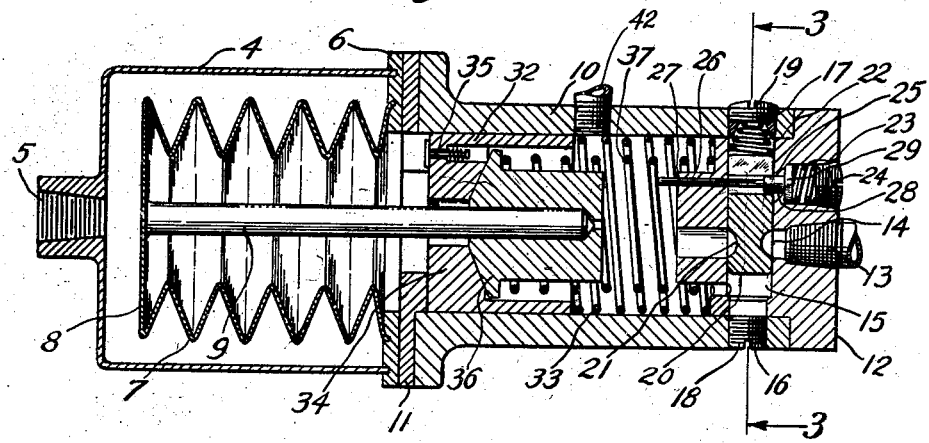
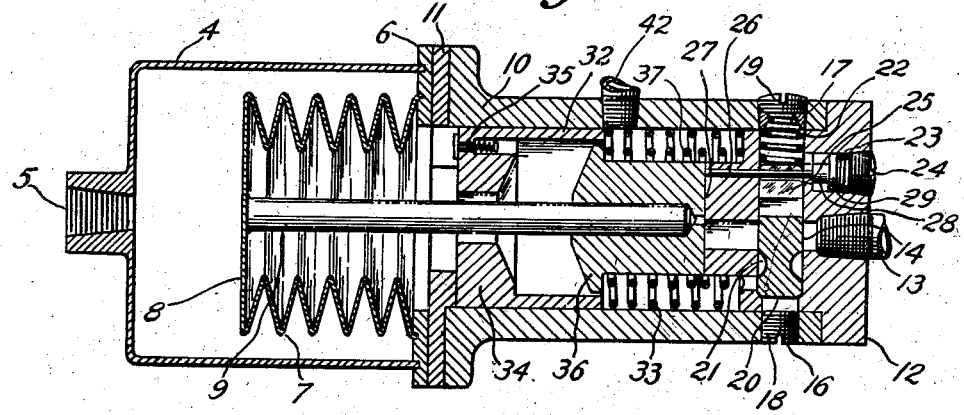
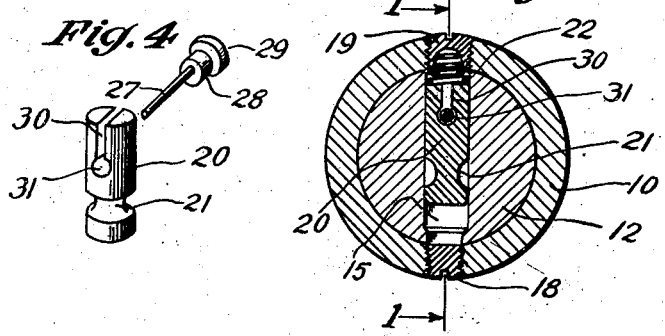
Inventor
George W. Kean
By Joseph K. Schofield
Attorney Patented Oct. 28, 1947

2,429,820

UNITED STATES PATENT OFFICE 2,429,820

SAFETY VALVE FOR HYDRAULIC BRAKES

George W. Kean, Granby, Conn.

Application March 22, 1945, Serial No. 584,184

4 Claims. (Cl. 303—84)

The invention to which the following specification relates is in safety cut-offs for hydraulic brake systems.

The application of hydraulic brakes to the separate wheels of a motor vehicle by foot applied fluid pressure transmitted from a single source such as a master cylinder is subject to difficulties which most frequently arise at the times when the operator is placing greatest reliance on the mechanism. Thus a sudden rupture of one of the several operating connections or conduits from the master cylinder to the brake applying cylinders will cause the sudden loss of the operating liquid in large quantity as well as causing a complete failure in the application of the brake to which the conduit or tubing is connected.

It is also well known that the gradual leakage of pressure fluid from a brake system results finally in the development of a situation where there is not enough pressure applied to the individual brakes to be effective. There is thus a loss of pressure in the brake at one wheel which may impair the effectiveness of the brake pressure applied to the remaining wheels. At the same time this condition gives rise to slow depletion of the fluid supplied in the master cylinder and the system thus becomes inoperative.

Wear in either the power applying cylinders at the wheels, or in the brake drums or brake shoes will also render the system inoperative as it will demand an excess quantity of the pressure fluid without obtaining adequate braking effect.

A primary object of my invention is to provide a positive cut-off for the pressure fluid in any one of the operating conduits or tubing of a brake system to which it may be connected.

This cut-off is designed to operate promptly on the occurrence of any abnormal condition during the application of the fluid pressure to apply the brake. Thus the sudden rupture of a single brake operating conduit will result in the cut-off of the fluid supply to an individual or a pair of brakes without, however, impairing its application to the remaining brakes.

Another object of my invention is to cut off the supply of pressure fluid where it is being delivered without effect on the brakes due to slow leakage. In other words the discharge of an excess quantity of pressure fluid without development of brake operating pressure results in actuating the cut-off.

A further object of my invention is to actuate the cut-off when the compressible bellows used to transmit pressure from the master cylinder to a pair of brakes or to an individual brake becomes worn, unresponsive or collapses.

Other objects of the invention will be apparent from the following description of the preferred form of the invention as illustrated in the accompanying drawing in which:

Fig. 1 is a longitudinal cross section taken on the line 1—1 of Fig. 3, of my improved device in normal or operating position;

Fig. 2 is a similar longitudinal section of the same mechanism as in Fig. 1 showing the cut-off operated by leakage of pressure in one of the brake tubings due to rupture or slow leakage;

Fig. 3 is a transverse section taken on the line 3—3 of Fig. 1 showing the cut-off plug in normal position;

Fig. 4 is an isometric view of the cut-off valve; and

Figure 5:
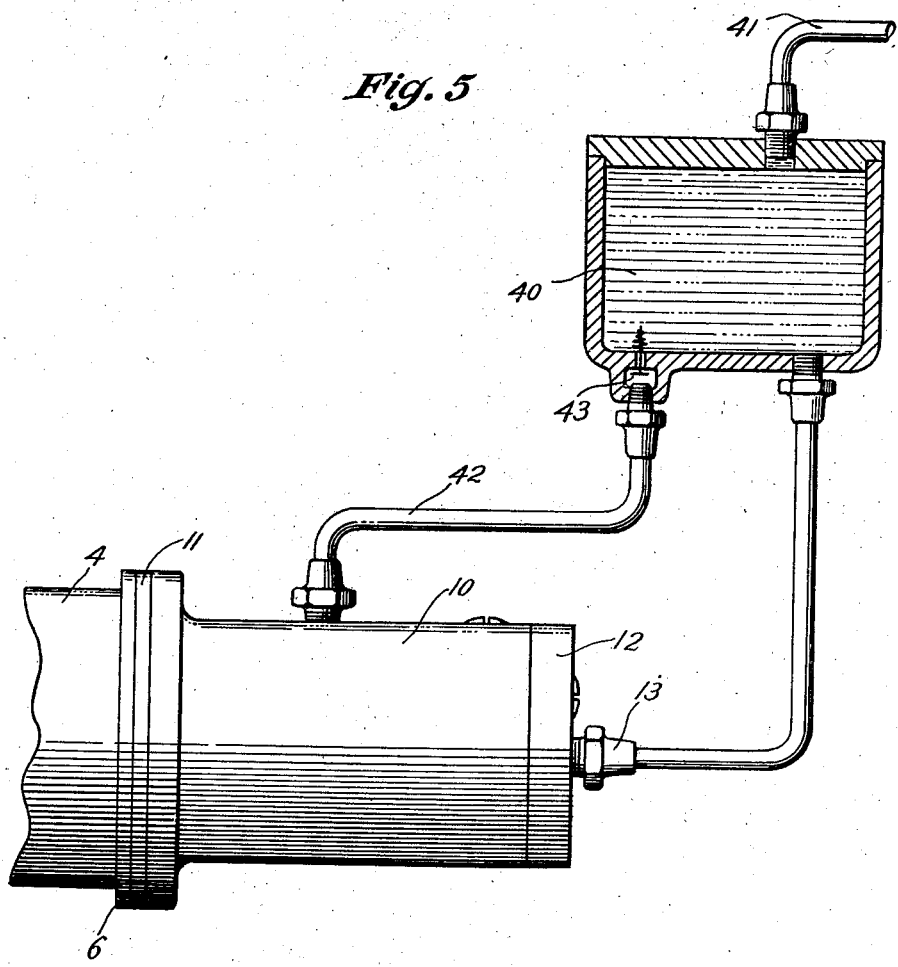
Fig. 5 is an outside view of the cut-off valve shown in Figs. 1 and 2 associated with a storage tank for fluid used in the brake system.

This safety device consists generally of a chamber receiving fluid pressure from a master cylinder or the like, means for applying this pressure to develop operating pressure in the brake cylinders and an associated cut-off valve in the pressure applying conduit. One of these units will be mounted in the conduits from the master brake cylinder to the individual or pairs of brake cylinders at the wheels. The pressure developed by the braking fluid in the system operates to actuate the cut-off valve on the occurrence of failure of pressure in the braking piping. Thus a chamber 4 receives the pressure directly from the master cylinder or the like through a pipe connection at the end fitting 5. The end of the chamber 4 opposite the fitting 5 is formed by a ring 6.

Within the chamber 4 there is a compressible bellows 7. One end of this bellows is anchored to the ring 6 while the opposite end is in the form of a disk 8 closely adjacent to the end of the chamber which has the fitting 5. This bellows has normal resilience but may be compressed to the degree indicated in Fig. 2, by the use of pressure in chamber 4 exceeding that in the pressure applying or brake operating tubing.

Disk 8 is fitted with a longitudinal shaft or rod 9 which projects beyond the end ring 6 of the pressure chamber and is reciprocated longitudinally whenever fluid pressure is applied through the fitting 5 to the interior of the chamber 4, and against the sides and end of the bellows 7.

A cylinder 10 is provided and adapted for fitting on the open end of the pressure chamber 4 and opposite the ring 6. An end plate 11 is fitted over the end of the cylinder 10 and forms a stop for a plunger presently to be described. The ring 6, the plate 11 and the flange of the cylinder 10 are clamped together in liquid tight relation.

The opposite end of the cylinder 10 is closed by means of an end plug 12 which is suitably fitted over and suitably secured to the end of the cylinder. The end plug 12 has a screw-threaded fitting 13 which in turn is connected by means of a longitudinal bore 14 to the interior of the cylinder 10.

A transverse bore 15 passes through the end plug 12 and also has registering openings 16 and 17 in the cylindrical side wall of the cylinder 10. These openings 16 and 17 are suitably closed by means of pipe plugs 18 and 19. The transverse bore 15 intersects the longitudinal bore 14.

A cut-off plug or valve 20 slides vertically in the transverse bore 15. This plug has an annular groove 21 which registers with the bore 14 when the plug is in its upper or normal position. A coil spring 22 between the upper end of the plug 20 and the pipe plug 19 urges the plug 20 into its closing position whenever the plug is released.

There is a longitudinal opening 23 in the end plug 12. This opening is parallel to the bore 14. The opening is relatively large at the outer portion of the end plug where it receives a pipe plug 24. There is also on the head 12 an intermediate diameter opening 25 where the opening or bore 23 intersects the transverse bore 15. Inwardly of the bore 15, there is a small opening 26 aligned with bore 25 and extending into the interior of the cylinder 10.

A latch pin 27 is provided for movement in the openings 25 and 27. The pin has a minimum diameter where it passes through the opening 26 and a larger diameter 28 in the opening 25. A flanged head 29 is provided on the outer end of the latch pin and is received in the opening 23 where it is held in the inward position by means of coil spring 29. In this inward position the intermediate diameter or shank 28 projects into the bore 15.

The upper end of the plug 20 is provided with a narrow slot 30 as shown in Fig. 3. This terminates at its lower end in a large circular opening 31 which runs transversely of the plug 20 and when the plug or valve 20 is in its open position this opening 31 registers with the opening 25 in the cylinder head.

The shank 28 of the latch pin projects into the opening 31 and serves to hold the plug 20 in its upper or open position against the force of the spring 22. However, when the projecting end 27 of the latch pin is driven outwardly the shank 28 moves beyond the bore 15 and the cut-off plug is released to drop into closing position across the opening 14. This movement is accelerated and assured by the coil spring 22.

It will be apparent that the cut-off plug can be restored to open position by removal of the pipe plug 18 when the cut-off plug may then be manually lifted into open position where the latch pin 28 will engage the circular opening 31.

The cylinder 10 has a slidable sleeve 32 which is held against the stop 11 by means of the coil spring 33. This sleeve has a transverse partition or seat across one end and a relatively large central bore through which the rod 9 projects. A pressure relief valve 35 passes through this seat and serves to transfer liquid to the left as shown in Fig. 1 to equalize pressures whenever pressure in the master cylinder is released.

Between the seat 34 and the cylinder head 12, the rod 9 carries a piston 36. This piston is loosely fitted on the rod 9 and has a conical end conforming to the seat 34 against which it is held by the spring 37. A supplemental spring 33 extends between the cylinder head and the flanged end of the piston 34 so that the return of the piston 36 to its normal seating position is accelerated. Piston 36 is free on rod 9 so that in case of bellows failure piston 34 and piston 36 can move to right as a unit, spring 37 being stronger than spring 33 to insure engagement of piston 36 on its seat.

In normal position pressure applied by means of the master cylinder to the pressure chamber 4 serves to compress the bellows 7 moderately. This results in lifting the piston 36 from the seat 34 and fluid pressure from within the bellows is then applied around the flange of the piston 36 and directly through the open bore 14 to the brake operating mechanism.

In normal operation the braking effect is accomplished before the bellows 7 is fully collapsed or and before the piston 36 approaches the cylinder head close enough to engage the latch pin 27. Therefore the cut-off plug remains in its upper or open position throughout the pressure applying step. On release of the pressure in the master cylinder the bellows 7 is restored to its expanded position and the spring 37 brings the piston 36 into seating engagement again. During this operation the pressure relief valve 35 will complete the transfer of enough liquid from the cylinder 10 into the bellows 7 to equalize pressure.

If however, there is a break in the tubing to the working cylinder of an individual brake or leakage is excessive there will be nothing to retard the movement of piston 36 and it will overcome the force of spring 37. Piston 36 then comes in contact with the latch pin 27 and drives the portion 28 of the latter out of engagement with the cut-off plug. The latter, under the influence of spring 22 drops down into closed position blocking further escape of pressure fluid. This conduit therefore remains cut off regardless of change in the position of the piston 36 or its retraction to normal inoperative position.

In the event that the bellows 7 becomes ineffective or so worn as to collapse under the pressure of the pressure fluid, then leakage or pressure fluid through the bellows or the sudden application of equivalent pressure within the bellows will overcome the forces of springs 33 and 37 and cause the sleeve 32 to slide toward the cylinder head carrying with it piston 36. As a result piston 36 will then release the cut-off plug 20 in the manner above described.

It will be apparent from the above that I have provided a simple and effective means for preventing undue loss of pressure fluid in braking systems where they have been rendered inoperative or defective by breaks or leakage in the conduits leading to the brake cylinders.

The brake operating movement itself serves to actuate a positive cut-off which is then permanent until the cut-off plug is manually reset. The operation also is carried out without disturbing the normal functioning of the remaining operative parts of other individual brakes.

The operation of the cut-off occurs in the event of any abnormal condition in the braking mechanism whether it is a matter of excess wear on the parts, slow leak or accidental rupture of the tubing.

Again if the bellows becomes broken or inoperative the pressure applied directly on the slide member 34 serves to cause the indirect actuation of the cut-off valve.

To permit the bellows 7 to return to its normal or expanded position after the cut-off valve 20 has operated, a storage tank 40 may be associated with the valve structure 10. Conduit 13 is connected to this tank 40 and a supplemental conduit 41 leading from the tank 40 extends to the brake or brakes to be operated.

Also leading from the tank 40 is a return conduit 42 extending to an intermediate portion of the body portion 10 so that fluid may pass from the tank 40 to the valve chamber and permit return movement of the bellows 7. In this conduit 42 is a check valve 43 preventing fluid from passing from conduit 42 into the tank 40.

While the preferred form is illustrated and described, minor changes in detail and proportions will suggest themselves as within the scope of the invention as defined in the following claims.

What I claim is:

1. A cut-off for brake-operating fluid pressure conduits comprising a chamber having an inlet for pressure fluid, a bellows closing one end of the chamber, a cylinder connected to the end of the chamber, a cylinder head having an outlet passageway, a cut-off valve for the passageway, a latch projecting into the cylinder and holding the cut-off valve in open position, a piston in the cylinder and means connecting the bellows with the piston for releasing the latch and permitting movement of said valve to its closed position when said piston moves to an extreme position.

2. A cut-off for brake-operating fluid pressure conduits comprising a chamber having an inlet for pressure fluid, a bellows closing one end of the chamber, a cylinder connected to the opposite end of the chamber, a cylinder head having an outlet passageway, an intersecting transverse bore in said cylinder head, a cut-off valve in said bore, resilient means to move the valve into position closing said passageway, a latch pin holding the plug in retracted position, a piston in the cylinder, a rod connecting the bellows with the piston, said pin projecting into the path of the piston for releasing the cut-off valve when said piston has moved to an extreme position.

3. A cut-off for brake-operating fluid pressure conduits comprising a chamber having an inlet for pressure fluid, a bellows closing one end of the chamber, a cylinder connected to the end of the chamber, a cylinder head having an outlet passageway, a transverse bore intersecting the passageway, a cut-off valve slidable in the bore, an opening from the transverse bore into the cylinder, a latch pin journalled in said opening, normally holding the pin in engagement with the valve and means in the cylinder responsive to fluid pressure for disengaging the pin from the valve to permit movement of said valve to its closed position.

4. A cut-off for brake-operating fluid pressure conduits comprising a chamber having an inlet for pressure fluid, a bellows closing one end of the chamber, a cylinder connected to the end of the chamber, a cylinder head having an outlet passageway, a transverse bore intersecting the passageway, a cut-off valve slidable in the bore, said valve having a slotted end and a connecting transverse opening, an opening from the transverse bore into the cylinder, a latch pin journalled in said opening and projecting into the cylinder, an enlarged head on the pin for slidable engagement in said transverse opening of the valve, resilient means for holding the pin in its projecting position and means in the cylinder responsive to the fluid pressure admitted to the chamber for disengaging the pin from the valve and permitting movement of said valve to its closed position.

GEORGE W. KEAN.

REFERENCES CITED

The following references are of record in the file of this patent:

UNITED STATES PATENTS

| Number | Name | Date |
|---|---|---|
| 1,952,557 | Masteller | Mar. 27, 1934 |
| 2,111,930 | Hinckley | Mar. 22, 1938 |
| 2,128,853 | Roen | Aug. 30, 1938 |
| 2,130,799 | Hofstetter | Sept. 20, 1938 |

FOREIGN PATENTS

| Number | Country | Date |
|---|---|---|
| 547,062 | France | Sept. 11, 1922 |